United States Patent

Miller et al.

[11] Patent Number: 5,945,646
[45] Date of Patent: Aug. 31, 1999

[54] MULTI-SWITCH DEVICE FOR CONTROLLING VEHICLE SUBSYSTEMS

[75] Inventors: Robin Mihekun Miller, Ellington, Conn.; Jerome Go Ng, Ann Arbor; Hollister A. Hartman, Northville, both of Mich.

[73] Assignee: Lear Automotive Dearborn, Inc., Southfield, Mich.

[21] Appl. No.: 08/906,017

[22] Filed: Aug. 4, 1997

[51] Int. Cl.$^6$ .................................................. H01H 13/70
[52] U.S. Cl. .......................... 200/5 R; 200/1 R; 200/5 A; 200/6 A; 200/600
[58] Field of Search ...................... 200/5 R, 5 A, 200/17 R, 18, 517, 600, 6 A, 1 R; 273/148 B; 345/157, 161, 163, 167–169, 173, 184; 364/709.01, 709.09, 709.11–709.13; 463/36–38

[56] References Cited

U.S. PATENT DOCUMENTS

| | | | |
|---|---|---|---|
| 4,200,837 | 4/1980 | Larsen et al. | 455/92 |
| 4,517,424 | 5/1985 | Kroczynski | 200/52 R |
| 4,717,098 | 1/1988 | Walker et al. | 244/223 |
| 4,849,732 | 7/1989 | Dolenc | 341/20 |
| 4,913,573 | 4/1990 | Retter | 400/489 |
| 4,971,465 | 11/1990 | Hashimoto | 400/485 |
| 5,178,477 | 1/1993 | Gambaro | 400/489 |
| 5,481,263 | 1/1996 | Choi | 341/20 |
| 5,735,693 | 4/1998 | Groiss | 434/157 |
| 5,743,666 | 4/1998 | VanZeeland et al. | 400/485 |
| 5,764,164 | 6/1998 | Cartabiano et al. | 341/22 |

FOREIGN PATENT DOCUMENTS

| | | | |
|---|---|---|---|
| 2745927 A1 | 9/1997 | France | G06K 11/18 |
| 4447103 A1 | 11/1995 | Germany | G06F 3/033 |

*Primary Examiner*—Michael Friedhofer
*Attorney, Agent, or Firm*—Brooks & Kushman P.C.

[57] ABSTRACT

A multi-switch control device is useful for controlling a variety of functions on a variety of vehicle subsystems or peripheral devices. The control device includes a specifically contoured base portion that enhances the usability of the device without distracting the vehicle operator from the task of driving. In one embodiment, a plurality of grooves are provided for receiving the fingers of the user of the device and a switch is provided within each groove that is readily usable by an individual regardless of the specific size of their fingers. Another embodiment includes a plurality of raised beads or grooves that provide a tactile indication of the position of the user's fingers on the device. The contoured portions also provide the ability of the user to make adjustments to a selected vehicle subsystem through conventional "touch-pad" technology.

17 Claims, 2 Drawing Sheets

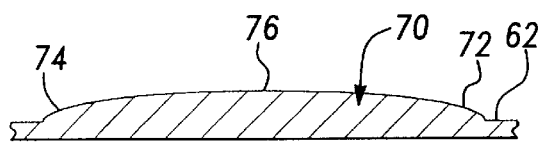
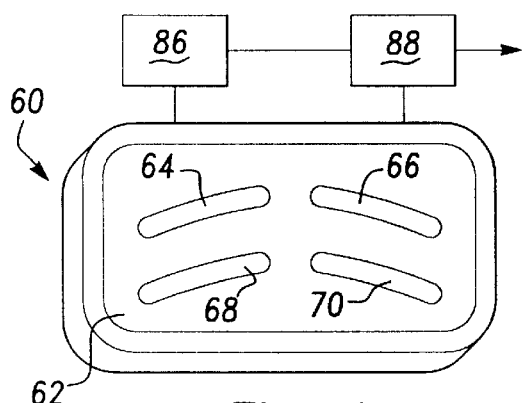
Fig-4
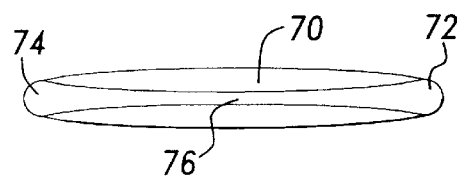
Fig-5
Fig-6
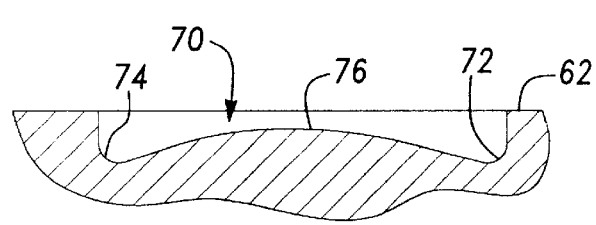
Fig-7
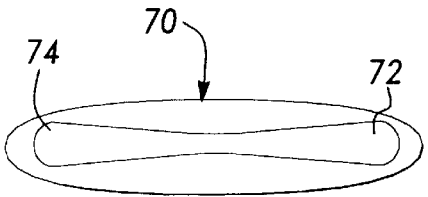
Fig-8
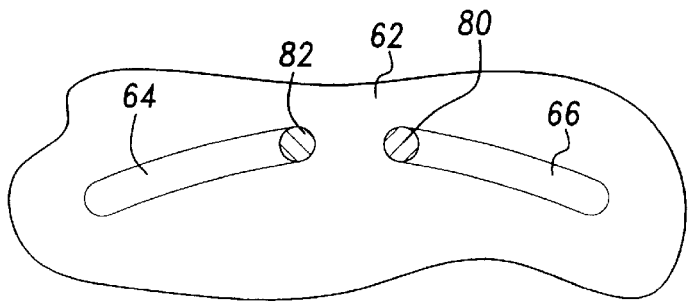
Fig-9

MULTI-SWITCH DEVICE FOR CONTROLLING VEHICLE SUBSYSTEMS

BACKGROUND OF THE INVENTION

This invention generally relates to a switching device for activating or adjusting a variety of subsystems within a vehicle.

Modern day vehicles include a variety of peripheral devices or subsystems. The increased availability and increased-versatility of such systems presents the challenge of developing efficient control devices to operate such subsystems.

There is a need for a device that enables a vehicle operator to choose a desired mode of operation for the various subsystems in a quick and efficient manner. A vehicle operator needs to devote the majority of their concentration to the task of driving the vehicle. Therefore, a large number of switches or buttons within a vehicle interior is not a particularly desirable solution. Such arrangements require the driver to divert their attention from the road, which is undesirable.

This invention overcomes the shortcomings and drawbacks of prior attempts at meeting the two-fold need for a sophisticated and efficient control device. This invention provides a simple, compact control device that can be custom tailored to a specific individual's physical characteristics and preferences.

SUMMARY OF THE INVENTION

In general terms, this invention is a control device for controlling a variety of subsystems within a vehicle. The control device includes features that allow a user to operate the device without having to visually observe it. One or more contoured portions on the device provide tactile indication to a user of the position of their hand relative to the device, which guides them in utilizing the device as desired. There are several basic elements to a device designed according to this invention including a base portion that provides a reference surface. A plurality of contoured portions deviate from the reference surface so that a user can properly position their hand relative to the device without having to look at it.

In one embodiment, the base portion includes a palm rest and a finger rest portion. The finger rest portion includes a plurality of grooves that receive the fingers of the user. Each of the grooves includes a switch that is positioned and sized to be readily usable by a variety of persons. Accordingly, whether a user has long fingers or short fingers, they will be able to readily and easily access the switches of the control device.

In one example, the sizing and specific contours of the device are custom molded to comfortably and uniquely fit a specific user. The device is then adaptable to be removed from a vehicle and used in a variety of vehicles through a simple and quick electrical connection.

In another embodiment, the base portion comprises a generally flat surface that defines a reference plane. The plurality of contoured portions deviate from the referenced plane and include, for example, a raised bead or a groove within the base portion. The beads or grooves preferably have a varying deviation from the referenced plane so that a user can locate the contoured portion and readily determine the position of their finger within the contoured portion.

In another enhancement, a switch is positioned within or upon each contoured portion. The switch can be a push-button activatable switch, for example. Such a switch preferably is located at one end of the contoured portion and enables a user to effect more than one type of control operation within a single contoured portion.

The various features and advantages of this invention will become apparent to those skilled in the art from the following detailed description of the presently preferred embodiments. The drawings that accompany the detailed description can be described as follows.

BRIEF DESCRIPTION OF THE DRAWINGS

FIG. 4 is a diagrammatic illustration of another embodiment of this invention.

FIG. 5 is a cross-sectional view of a contoured portion of the embodiment of FIG. 4.

FIG. 6 is a top elevational view of the contoured portion of FIG. 5.

FIG. 7 is a cross-sectional illustration of another embodiment of a contoured portion.

FIG. 8 is a top elevational view of the contoured portion of FIG. 7.

FIG. 9 is a diagrammatic illustration of an enhancement of the embodiment of FIG. 4.

DETAILED DESCRIPTION OF THE PREFERRED EMBODIMENTS

Figure 1:
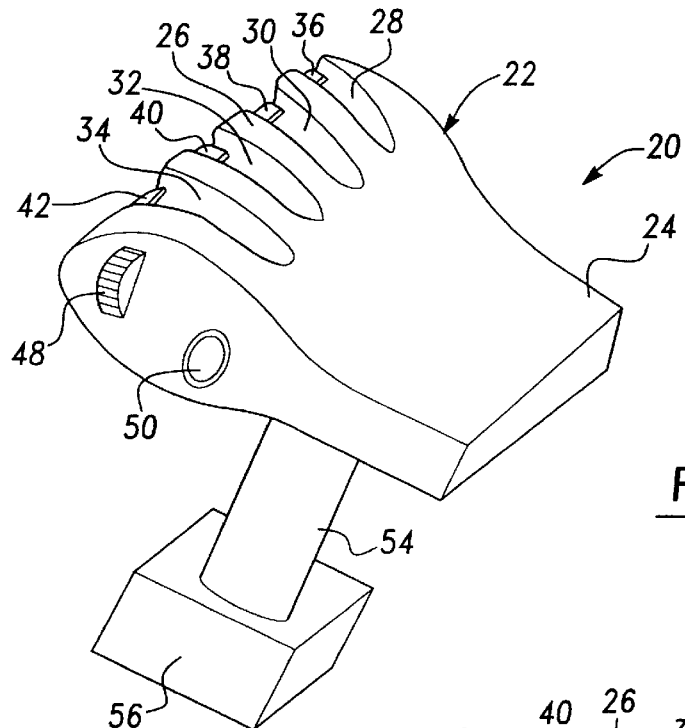
FIG. 1 is a perspective, diagrammatic view of a control device designed according to this invention.

FIG. 1 illustrates a multi-switch control device 20 that is usable for controlling a variety of subsystems within a vehicle. The control device 20 includes a base portion 22 that is specifically designed and shaped to serve as a hand rest for a vehicle operator. The base portion 22 includes a palm rest portion 24 and a finger rest portion 26. A plurality of grooves 28, 30, 32 and 34 are provided on the finger rest portion 26. The grooves 28–34 preferably are specifically contoured to provide a comfortable and natural fit for a user's hand. In the illustrated embodiment, the groove 34 would receive the index finger on the right hand of an individual while the groove 28 would receive the finger that is most distal from the thumb. In some situations it is desirable to have the base portion 22 be custom made and molded to conform and comfortably fit a particular individual's hand.

In situations where the base portion 22 is not custom made, the grooves 28–34 have a length and a depth that are adapted to receive a variety of person's fingers. It is desirable to align and shape the grooves so that individuals with relatively large fingers can readily use the device 20 as easily as individuals having relatively small fingers.

A plurality of switches 36, 38, 40 and 42 are provided, one in each of the grooves. The switches preferably are positioned near the end of each groove that is furthest from the palm rest portion 24. The switches preferably are sized so that a variety of individuals can readily use the control device 20 regardless of the length of their fingers or fingernails. In the illustrated embodiment, the switches 36–42 are simple push button switches, which can be realized through a variety of well known switching structures.

The control device 20 also includes two thumb control switches. One side of the base portion 22 includes a first switch 48 and a second switch 50. In the illustrated embodiment, the first switch 48 is realized through a rotary knob while the second switch 50 is realized through a push-button type switch. These two switches provide further versatility and enable a user to accomplish more control functions through the single, compact device 20.

The base portion 22 is supported on a support member 54 so that the base portion 22 is movable relative to the support member. In the preferred embodiment, the base portion 22 can be pivoted over a variety of directions and rotated about the support member 54. A conventional yoke arrangement or other support structure, which would be known to those skilled in the art, can be utilized to connect the base portion 22 to the support member 54. The movement of the base portion 22 relative to the support member 54 is schematically illustrated by the arrows in FIG. 3.

The end of the support member 54 opposite from the base portion 22 includes a connector portion schematically illustrated at 56. The connector portion 56 facilitates interconnecting the control device 20 with the vehicle subsystems through a hard-wired, wireless (such as infrared) or inductive link, for example.

In an embodiment where the base portion 22 is custom molded to an individual's hand, it is most useful to have the connecting portion 56 be readily removable from a vehicle. This provides the significant advantage of enabling an owner of the device 20 to remove it from one vehicle and use it in a variety of vehicles, provided that each vehicle has an appropriate receptacle for the connecting portion 56.

Figure 2:
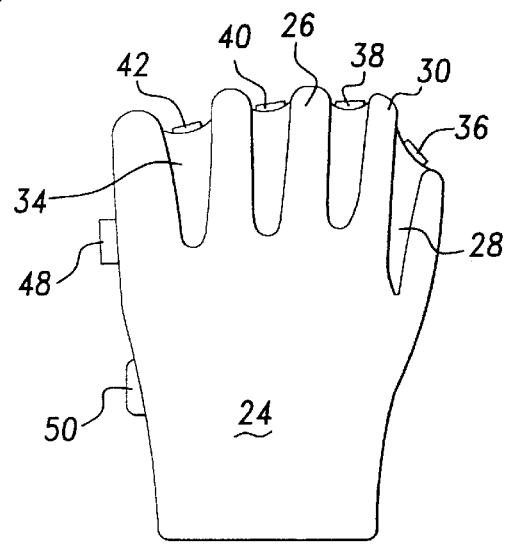
FIG. 2 is a top elevational view of the embodiment of FIG. 1.
Figure 3:
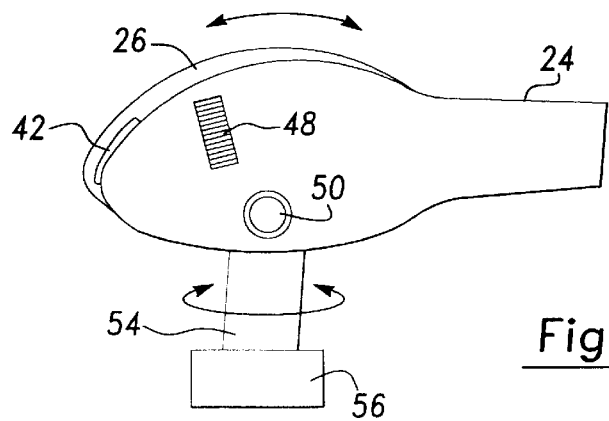
FIG. 3 is a side elevational view of the embodiment of FIG. 1.

The device illustrated in FIGS. 1 through 3 preferably is used in the following general manner. A user comfortably rests their palm on the palm rest portion 24 and positions their fingers within the grooves 28–34. A variety of systems can be controlled by simply activating one or more of the switches that are supported on the base portion 22. Further, moving the base portion 22 relative to the support member 54 generates electrical signals indicating a user's desire to change between vehicle subsystems, for example. Given this description, those skilled in the art will be able to realize the specific mechanical and electrical components needed to make the illustrated device workable within a particular vehicle.

FIG. 4 diagrammatically and schematically illustrates another embodiment of this invention. The device 60 of FIG. 4 includes a base portion 62 that preferably is a generally planar surface. The surface of the base portion 62 provides a reference plane. The base portion 62 can be conveniently mounted within the interior of the vehicle on an armrest or other surface that is readily accessible to a driver of the vehicle.

The base portion 62 has a plurality of contoured portions 64, 66, 68 and 70. These contoured portions provide tactile indications to a user of the position of their finger(s) on the base portion 62 and allow the user to control various subsystems. The contoured portions have a profile that deviates from the reference plane provided by the base portions 62. The contoured portions can be realized in a variety of manners.

FIG. 5 diagrammatically illustrates one preferred embodiment of the contoured portions. The contoured portion 70 is selected and shown in cross section to illustrate how it deviates from the reference plane of the generally flat surface of the base portion 62. In the embodiment illustrated in FIG. 5, the contoured portion is a raised bead. The bead preferably includes a height that varies along the length of the bead. For example, the two ends 72 and 74 have a lesser height than the central portion or apex 76 of the bead. Having a varying height or contour enables a user to readily determine the position of their finger on the bead. For example, if a user were to place their finger on the end 74 of the bead and move it to the right (according to the drawing), they would be able to determine when they have passed the midpoint of the bead because they would sense that they have run their finger over an apex as their finger begins to again approach the generally flat surface of the base portion 62. Of course, it is possible to provide a variety of configurations for the bead 70.

Referring now to FIGS. 7 and 8, a second embodiment of the contoured portions is illustrated. In this embodiment, the contoured portion 70 comprises a groove within the surface of the base portion 62. The groove preferably includes a varying depth that provides a tactile indication to the user of the position of their finger within the groove. The groove preferably has a depth and width that readily and comfortably receives at least the most distal portion of a user's finger.

The device of FIG. 4 is used in the following general manner. The user of the device 60 places one (or more) of their fingers on a selected contoured portion. In this example, the contoured portion 70 is realized as a groove as illustrated in FIGS. 7 and 8, for example. When the user places their finger within the groove 70, a sensor assembly 86 determines the position of the user's finger within the groove 70. This can be accomplished through "touch pad" technology as is known by those skilled in the art. Assuming that the groove 70 corresponds to an adjustment of the temperature within the vehicle, moving the finger from one end 74 to the other end 72 of the groove will result in an adjustment of the temperature. For example, the end 74 of the groove can correspond to the coldest temperature setting while the end 72 corresponds to the hottest temperature setting. As the user moves their finger along the groove 70, the vehicle system is controlled according to the position of the user's finger. The sensor assembly 86 preferably not only recognizes an instantaneous location of a finger but also detects and determines movement of a finger within the groove. A signal generator, schematically illustrated at 88, generates appropriate signals corresponding to the desires of the user and communicates those to a vehicle subsystem controller (not illustrated). In this general manner, an adjustment of a vehicle subsystem can be made.

A significant advantage of this embodiment of this invention is that a user need not visually observe or look at the control device 60 when making a desired adjustment to a selected vehicle subsystem. Instead, the user need only realize the location of their finger(s) on one of the contoured portions through tactile feedback based upon their familiarity with the device 60.

FIG. 9 illustrates a further enhancement of the embodiment of FIG. 4. In FIG. 9, the contoured portions 66 and 64 include switches 80 and 82, respectively. The switches preferably are located at one end of the contoured portions. These switches can be used in a variety of manners. For example, the switches can be push-button type switches that enable a user to effect a desired control of a subsystem that is being adjusted within the vehicle. Alternatively, the switches 80 and 82 can be used to provide an indication to the system controller (not illustrated) that a user desires to make an adjustment of a particular vehicle subsystem function.

In an embodiment where switches 80 and 82 are included, the switches can be used to activate or deactivate a particular contoured portion. For example, assume that the control device 60 is poised and ready to adjust the vehicle climate control subsystem. Each of the contoured portions can be dedicated to a specific function such as temperature, fan speed, and vent door position. When the user desires to adjust the temperature, it would be undesirable to accidently adjust the fan speed by placing their finger in the wrong contoured portion. Accordingly, the switches 80 and 82 can serve the function of being activatable by the user once the user realizes that they have their finger placed in the proper contoured portion. Once the appropriate position is realized, the user activates the corresponding switch and then makes an adjustment by positioning or moving their finger on the contoured portion as generally described above. In other situations, the switches 80 and 82 can be dedicated to turning a particular vehicle subsystem function on or off or making other adjustments depending on the needs of a particular application.

The foregoing description is exemplary rather than limiting in nature. Variations and modifications to the disclosed embodiments may become apparent to those skilled in the art that do not necessarily depart from the purview and spirit of this invention. Accordingly, the legal scope of protection afforded this invention can only be determined by studying the following claims.

What is claimed is:

1. A device for controlling an adjustable subsystem within a vehicle, comprising:

a base portion having a surface to be touched by a user;

a plurality of grooves in said base portion, each of said grooves having a length and a depth to comfortably receive a portion of a finger of the user when the user places a hand adjacent said base portion; and a switch located near one end of each of said grooves, said switches being manipulatable by a finger of the user to thereby activate or adjust a selected portion of the subsystem;

wherein said base portion is supported on a support member for movement in at least two distinct directions and wherein said movement of said base portion relative to said support member generates signals indicative of a selected adjustment or activation of a selected portion of the subsystem.

2. The device of claim 1, wherein said base portion includes a palm rest portion that is contoured to comfortably support a palm of the user and a finger rest portion having said grooves extending along said finger rest portion in a direction generally away from said palm rest portion so that one end of each of said grooves is adjacent said palm rest portion and a second end of each of said grooves is distal from said palm rest portion and wherein said switches are each located adjacent a corresponding one of said distal ends.

3. The device of claim 2, wherein said base portion is molded and contoured to accurately fit a specific user's hand.

4. The device of claim 2, wherein said base portion includes a plurality of surface contours that conform to a natural shape and contour of the user's hand and are positioned such that the user's hand is naturally comfortable when supported on said base portion in a most preferred position wherein all of the user's fingers are received in a corresponding one of said grooves on said base portion whereby the user need not look at the device to effect a desired control of the subsystem.

5. The device of claim 2, wherein said base portion has a top surface, a bottom surface generally opposite said top surface, a front surface and a rear surface at opposite ends of said base portion and extending between said top and bottom surfaces, respectively, and two side surfaces extending between said top and bottom surfaces and said front and rear surfaces, respectively, and wherein said device further comprises a thumb control supported on one of said side surfaces and moveable by a thumb of the user to activate or adjust a selected portion of the subsystem.

6. The device of claim 1, wherein said support member has an end distal from said base portion that includes an electrical connection and wherein the vehicle has an electrical outlet for receiving said electrical connection and wherein said device is removable from the vehicle and useable in a plurality of vehicles having an electrical outlet for receiving said electrical connection.

7. The device of claim 1, wherein said base portion has a generally flat surface and wherein said grooves are spaced from each other on said surface and wherein each of said switches is moveable between a raised position and a pressed position relative to a corresponding one of said grooves.

8. The device of claim 7, wherein each of said grooves has a varying contour along said length of said groove such that said contour provides tactile feedback to the user of a location of the user's finger within said grooves.

9. The device of claim 8, including a sensor assembly that senses a location of a finger of the user within said grooves and responsively generates signals indicative of the location of the user's finger and wherein said signals are utilized to control the subsystem.

10. A device for controlling an adjustable subsystem within a vehicle, comprising:

a base portion having a generally flat surface to be touched by a user, said base portion defining a reference plane;

a plurality of contoured portions that have surfaces outside of said reference plane such that said contoured portions are locatable by a user through tactile feedback;

a sensor assembly that determines and indicates a position of a finger of a user on at least one of said contoured portions; and a signal generator that generates control signals for controlling the subsystem responsive to an indicated position of the user's finger on one of said contoured portions;

wherein said contoured portions comprise grooves defined in said base portion having a length and a depth to comfortably receive at least a distal portion of the user's finger so that the user can place a portion of the finger within a selected one of said grooves and move the finger along said length, said grooves having a width that varies along said length for providing tactile feedback to the user indicative of a position of the user's finger within said groove.

11. The device of claim 10, wherein each of said depth varies within said grooves along said length to thereby provide tactile feedback to the user indicative of a position of the user's finger within said groove.

12. The device of claim 10, wherein said signal generator generates control signals responsive to movement of the finger within at least one of said grooves.

13. The device of claim 10, further comprising a switch at one end of each of said grooves, each of said switches being activatable by the user's finger and wherein said signal generator generates an appropriate control signal responsive to activation of said switch.

14. A device for controlling an adjustable subsystem within a vehicle, comprising:
 a base portion having a generally flat surface to be touched by a user, said base portion surface defining a reference plane;
 a plurality of contoured portions that have surfaces outside of said reference plane such that said contoured portions are locatable by a user through tactile feedback;
 a sensor assembly that determines and indicates a position of a finger of a user on at least one of said contoured portions; and
 a signal generator that generates control signals for controlling the subsystem responsive to an indicated position of the user's finger on one of said contoured portions;
 wherein said contoured surfaces comprise raised beads that protrude generally outward from said reference plane and wherein each bead has a length extending generally in alignment with said reference plane and a height taken generally perpendicular to said reference plane along said length and wherein said height varies along said length to thereby provide tactile feedback to a user indicative of a position of the user's finger on said bead.

15. The device of claim 14, further comprising a switch at one end of each of said beads, each of said switches being activatable by the user's finger and wherein said signal generator generates an appropriate control signal responsive to activation of at least one of said switches.

16. The device of claim 14, wherein said signal generator generates control signals responsive to movement of the finger along at least one of said raised beads.

17. The device of claim 14, further comprising a switch at one end of each of said raised beads, each said switch being activatable by the user's finger and wherein said signal generator generates an appropriate control signal responsive to activation of said switch.

* * * * *